United States Patent [19]
Adams

[11] 4,448,088
[45] May 15, 1984

[54] RACK BAR AND PINION ASSEMBLY AND A STEERING GEAR INCLUDING SUCH AN ASSEMBLY

[75] Inventor: Frederick J. Adams, Clevedon, England

[73] Assignee: Cam Gears Limited, Hertfordshire, England

[21] Appl. No.: 357,312

[22] Filed: Mar. 11, 1982

[30] Foreign Application Priority Data

Mar. 24, 1981 [GB] United Kingdom ............... 8109108

[51] Int. Cl.³ .................... F16H 1/04; B62D 1/20
[52] U.S. Cl. ........................................ 74/422; 74/498
[58] Field of Search ............................ 74/422, 498

[56] References Cited

U.S. PATENT DOCUMENTS

| | | | |
|---|---|---|---|
| 3,421,387 | 1/1969 | Adams | 74/498 |
| 3,792,624 | 2/1974 | Pitner | 74/422 |
| 3,901,344 | 8/1975 | Adams | 74/498 |
| 3,979,968 | 9/1976 | Ceccherini | 74/498 |
| 3,983,765 | 10/1976 | Pitner | 74/498 |
| 4,116,085 | 9/1978 | Bishop | 74/498 |
| 4,215,591 | 8/1980 | Bishop | 74/422 |
| 4,224,833 | 9/1980 | Jablonsky | 74/498 |
| 4,299,302 | 11/1981 | Nishikawa et al. | 74/498 |
| 4,322,986 | 4/1982 | Adams et al. | 74/498 |
| 4,352,304 | 10/1982 | Warner | 74/498 |

Primary Examiner—Lawrence J. Staab
Assistant Examiner—Michael D. Bednarek
Attorney, Agent, or Firm—Yount & Tarolli

[57] ABSTRACT

A rack bar and pinion assembly includes a rack bar 1 having a rack biased into operative engagement with a pinion 2 mounted in a pinion housing 3, under all steering loads. A support assembly 4 includes a rack bar carrier 5 consisting of carrier members 5a and 5b biased into engagement with support surfaces 1a and 1b of the rack bar by a coil spring 6. Under heavy steering loads, the rack bar 1 moves along the axis X—X and a third surface 1c is also capable of engaging the low friction manner with a roller 7 located at a predetermined clearance from the remote side of the rack bar 1 when the rack is in substantially fully enmeshed engagement with the pinion 2.

9 Claims, 1 Drawing Figure

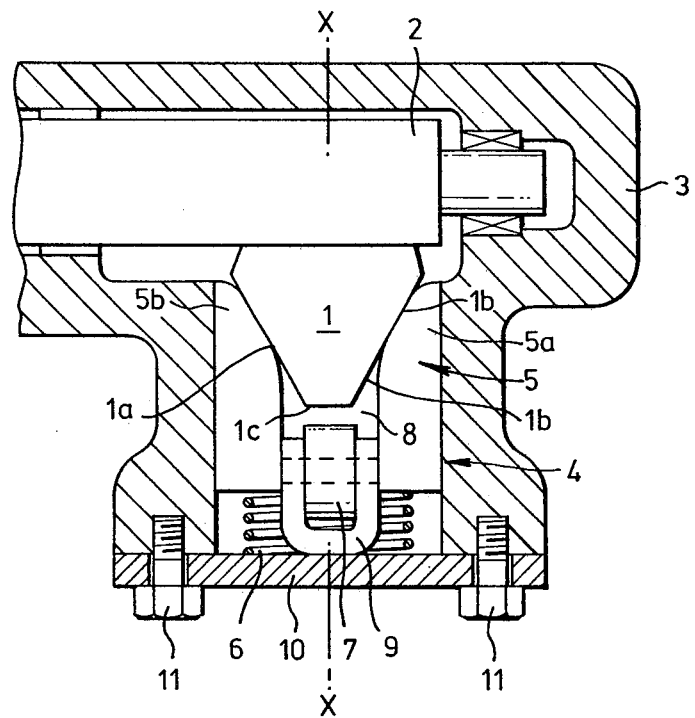

RACK BAR AND PINION ASSEMBLY AND A STEERING GEAR INCLUDING SUCH AN ASSEMBLY

TECHNICAL FIELD

This invention relates to rack bar and pinion assemblies and is particularly concerned with such assemblies as are used in steering gears.

BACKGROUND ART

A rack bar and pinion assembly of the type with which the present invention is concerned (hereinafter referred to as "the type specified") includes a pinion rotatively mounted in a pinion housing; a rack bar linearly movable in a longitudinal direction through said pinion housing; and a rack on said rack bar operatively connected with the pinion so that rotation of the pinion effects movement of the rack bar through the pinion housing.

A rack bar assembly of the type specified has been proposed in U.S. Pat. No. 4,215,591 for use in a vehicle, and this includes a support assembly adapted to support the rack bar in the pinion housing with rollers spring biased into contact with the side of the rack bar remote from the pinion under all steering loads. The rollers bias the rack bar towards the pinion and, thereby, the rack teeth into engagement with the pinion, but are intended to allow for efficient and ease of steering under light loads. The support assembly also includes plain bearing surfaces defining a wedge at a fixed distance from the pinion which the rack bar is intended to only contact under high loads such as when the rack bar is under shock loading. Such an arrangement is proposed to alleviate "rack-rattle" but tends to have the disadvantage that, for example, where heavy manoeuvres are undertaken such as in parking, the steering effort will be considerably greater to the driver than when driving generally in the forward direction and undertaking gentle manoeuvres. This is largely due to the rack bar under heavy loads being urged into wedging engagement with bearing surfaces which are plain and a fixed distance from the pinion.

It is an object of the present invention to provide a rack bar and pinion assembly in which the steering effort at high loads is not unduly increased.

STATEMENT OF INVENTION AND ADVANTAGES

According to the present invention there is provided a rack bar and pinion assembly of the type specified which includes a support assembly adapted to support the rack bar to maintain said operative connection between the rack and pinion, the assembly being situated between the pinion housing and the rack bar on the side of the rack bar remote from the rack, the support assembly comprising a rack bar carrier which is slidable in the pinion housing in a direction substantially normal to the longitudinal direction of movement of the rack bar and is resiliently mounted relative to the pinion housing to be biased into engagement with said remote side of the rack bar, and support means capable of engaging in low friction manner with said remote side of the rack bar for longitudinal movement thereover during longitudinal movement of the rack bar through the pinion housing, the support means being spaced in said normal direction by a predetermined clearance from said remote side of the rack bar when the rack is biased by the rack bar carrier into substantially fully enmeshed engagement with the pinion with relatively light loads resisting movement of the rack bar, and wherein with relatively heavier loads on the rack bar, the rack bar is capable of moving in said normal direction against the bias of the rack bar carrier into low friction sliding engagement with the support means for additional support.

Further according to the present invention there is provided a vehicle steering gear including an assembly as described in the immediately preceding paragraph.

In a preferred embodiment the rack bar carrier has two transversely spaced bearing surfaces which are preferably generally curved in the normal direction, and the rack bar has two support surfaces on said remote side engaged by respective ones of said transversely spaced bearing surfaces. Such support surfaces are inclined relative to the normal direction and, where the transversely spaced bearing surfaces are curved as aforesaid the support surfaces are conveniently planar and substantially tangential thereto. Wedging of the rack bar between the bearing surfaces is alleviated by the resilient mounting of the carrier and the eventual engagement by the rack bar with the support means.

Where convenient the rack bar carrier may be biased into engagement with the remote side of the rack bar by a coil spring extending between the carrier and the pinion housing. Alternatively any suitable biasing means may be employed.

The support means may be a further plain bearing surface providing low friction sliding engagement with the remote side of the rack bar when the latter engages the further bearing surface. Preferably, however, the support means is in the form of roller means comprising a roller capable of engaging with said remote side of the rack bar and of rotating in sympathy with the rack bar during longitudinal movement of the rack bar through the pinion housing over the roller.

The roller means may comprise a support member carrying the roller for said rotational movement and, preferably, comprises a U-shaped element between the legs of which the roller is carried.

In the aforementioned preferred embodiment, the two support surfaces may be inclined towards a longitudinally extending third support surface on the remote side of the rack bar, said third support surface lying perpendicular to said normal direction and being engageable by the roller; the roller, and conveniently the aforementioned support member, being provided in a recess defined by the carrier. Where the support member is provided in a recess defined by the carrier as aforementioned, the carrier may comprise two transversely spaced carrier members each having a respective one of the two bearing surfaces, the support member being engaged in sliding manner by the carrier members for movement of the latter in said normal direction, whereby the support member assists in maintaining the spacing of the carrier members.

Conveniently, but not essentially, the axis of the roller is fixed in use relative to the pinion housing, but it is possible that the roller may be biased towards said predetermined clearance from the rack bar. Further, the predetermined clearance between the support means, for example, the roller, and the remote side of the rack may be selectively adjustable.

FIGURES IN THE DRAWINGS

An embodiment of a rack bar and pinion assembly in accordance with the present invention will now be described, by way of example only, with reference to the accompanying FIGURE which shows a sectional view of the assembly which is taken transversely to the longitudinal axis of the rack bar.

DETAILED DESCRIPTION OF THE DRAWINGS

The FIGURE shows a rack bar 1 having a rack operatively connected with a pinion 2 mounted in a pinion housing 3. The pinion 2 is rotatively mounted in the housing 3 so that clockwise or anticlockwise rotation of the pinion effects linear movement of the rack bar 1 in the longitudinal direction of the rack bar, i.e. in a direction into or out of the paper as shown in the FIGURE. This part of the assembly as so far described is well known in conjunction with, for example, vehicle steering gear, and so will not be described further.

In the FIGURE the operative connection between the rack and pinion is maintained by a support assembly 4, which supports the rack bar and is located between the pinion housing 3 and the rack bar on the side of the rack bar remote from the rack. The support assembly 4 includes a rack bar carrier 5 which is slidable relative to the pinion housing 3 along an axis X—X, which is normal to the longitudinal direction of movement of the rack bar, and is biased into engagement with the remote side of the rack bar by a coil spring 6. The support assembly 4 also includes support means in the form of roller means comprising one or more rollers 7 mounted to rotate about an axis perpendicular to the longitudinal direction of the rack bar and spaced along the axis X—X by a predetermined clearance from the rack bar 1 when the rack bar is urged into substantially full meshing engagement with the pinion 2 by the carrier 5.

The rack bar is of generally polygonal transverse section with two transversely spaced sides 1a, 1b, comprising support surfaces inclined relative to the axis X—X of the rack bar and converging towards a third side 1c which is also a support surface and lies perpendicular to the axis X—X and is engageable by the roller or rollers 7. The rack bar carrier 5 comprises two slidable carrier members 5a and 5b each having a curved bearing surface of low friction material in contact with the rack bar and extending in the longitudinal direction of the rack bar, the bearing surfaces being on respective sides of the axis X—X and the support surfaces 1a, 1b, lying substantially tangential thereto. A recess 8 is defined between the carrier members 5a and 5b in which a support member 9 carrying the roller or rollers 7 is located with the carrier members 5a and 5b in sliding engagement with the sides of the housing 3 and the support member 9. The support member 9 is U-shaped in cross section and the legs of the U-shape element support an axle for the or each roller 7. The support member 9 may be fixed relative to the housing 3 as in the FIGURE by any convenient means or may instead be spring loaded on the housing and capable of movement in said normal direction along the axis X—X.

Each carrier member 5a and 5b is biased towards the rack bar 1 by the coil spring 6 acting between the base of the carrier members on either side of the support member 9 and a cover plate 10 which closes off the housing 3.

The FIGURE shows the relative positions of the various parts of the assembly in use in a steering gear when there is little or no steering load on the rack bar 1. As the load on the rack bar 1 increases such as when the steering gear is fitted to a vehicle and the vehicle undergoes a manoeuvre such as parking, the rack bar 1 will be displaced in the normal direction towards the roller or rollers 7 while moving the rack bar carrier 5 in the same direction against the biasing force provided by the spring 6. Eventually, as the load increases the rack bar 1 will engage the roller or rollers 7 to give additional support and said roller or rollers will rotate in sympathy with the longitudinal movement of the rack bar 1. As the load is decreased the rack bar 1 moves out of engagement with the roller or rollers 7 but still engages the bearing surfaces of the carrier members 5a and 5b.

The biasing force of the spring 6 may be adjusted by providing a shim between the spring and the cover plate 10. Such a shim may also adjust the predetermined clearance of the roller or rollers 7 from the rack bar 1. The cover plate 10 is removable by means of bolts 11.

I claim:

1. A rack and pinion assembly comprising:

a housing, a pinion rotatively mounted in said housing, a rack member movable in a longitudinal direction in said housing, said rack member having a rack thereon operatively connected with said pinion so that rotation of said pinion effects movement of said rack member in said longitudinal direction in said housing, means for continuously supporting said rack member to maintain the operative connection between said rack and pinion and for preventing displacement of said rack member laterally of said longitudinal direction, and additional means for supporting said rack member only when the load on said rack member exceeds a predetermined amount, said means for continuously supporting said rack member and said additional means being located between said housing and said rack member on the side of said rack member remote from said rack, said means for continuously supporting said rack member including:

a rack member carrier, a spring means for biasing said rack member carrier into engagement with said remote side of said rack member, and a means for constraining said rack member carrier for slidable movement in said housing in a direction substantially normal to said longitudinal direction of movement of said rack member and relative to said additional means, said rack member carrier including two transversely spaced bearing surfaces, said rack member having two transversely spaced support surfaces on said remote side continuously engaged by respective ones of said transversely spaced bearing surfaces, said transversely spaced bearing surfaces being inclined relative to said normal direction and converging towards a flat bottom support surface, said additional means including a roller means for engaging said flat bottom support surface in a low friction manner, said roller means being spaced from said flat bottom support surface of said rack member when the load on said rack member is less than said predetermined amount, and means for supporting said roller means for rotation about an axis extending transverse to the longitudinal direction of movement of said rack and parallel to said flat bottom surface.

2. An assembly as claimed in claim 1 wherein said spring means comprises a coil spring.

3. An assembly as claimed in claim 1 wherein said additional means are located in a chamber defined by said means for continuously supporting said rack member.

4. An assembly as claimed in claim 3 wherein said rack member carrier comprises two transversely spaced carrier members each comprising a respective one of said two transversely spaced bearing surfaces, and said additional means being engaged by said carrier members in a sliding manner for movement of said carrier members relative to said additional means.

5. An assembly as claimed in claim 1 in which the spaced bearing surfaces are curved generally in the normal direction and the support surfaces of the rack member are planar and substantially tangential to said curved bearing surfaces.

6. An assembly as claimed in claim 1 in which the roller means comprises a support member carrying a roller for a rotational movement.

7. An assembly as claimed in claim 6 in which the support member comprises a U-shaped element between the legs of which the roller is carried.

8. An assembly as claimed in claim 6 in which the support member is restrained from movement in said normal direction by the housing.

9. An assembly as claimed in claim 6 in which the axis of the roller is fixed in use relative to the housing.

* * * * *